United States Patent
Bordignon et al.

(10) Patent No.: US 9,296,055 B2
(45) Date of Patent: Mar. 29, 2016

(54) AUTOMATIC THREADING MACHINE

(71) Applicant: BORDIGNON SIMONE S.R.L., Vicenza (IT)

(72) Inventors: Simone Bordignon, Rossano Veneto (IT); Alberto Bordignon, Rosà (IT)

(73) Assignee: BORDIGNON SIMONE S.R.L., Rossano Veneto (IT)

( * ) Notice: Subject to any disclaimer, the term of this patent is extended or adjusted under 35 U.S.C. 154(b) by 501 days.

(21) Appl. No.: 13/859,402

(22) Filed: Apr. 9, 2013

(65) Prior Publication Data

US 2013/0266387 A1 Oct. 10, 2013

(30) Foreign Application Priority Data

Apr. 10, 2012 (IT) .............................. VR2012A0069

(51) Int. Cl.
*B23Q 5/32* (2006.01)
*B23G 1/18* (2006.01)
*B23G 1/00* (2006.01)

(52) U.S. Cl.
CPC .. *B23G 1/00* (2013.01); *B23G 1/18* (2013.01); *B23G 2240/40* (2013.01); *Y10T 408/6757* (2015.01)

(58) Field of Classification Search
CPC .......... B23Q 5/10; B23Q 5/261; B23Q 5/263; B23Q 5/265; B23Q 5/32; B23G 2240/40; B23G 1/165; B23G 1/18
USPC .................................................. 408/130, 141
See application file for complete search history.

(56) References Cited

U.S. PATENT DOCUMENTS

| 2,563,497 | A |   | 8/1951  | Sinclaire |                    |
|-----------|---|---|---------|-----------|--------------------|
| 2,863,160 | A | * | 12/1958 | Ovshinsky | B23G 1/16 408/11   |
| 3,124,979 | A | * | 3/1964  | Macks     | B23Q 1/38 173/148  |
| 3,158,883 | A | * | 12/1964 | Barr      | B23Q 1/4828 408/130 |

(Continued)

FOREIGN PATENT DOCUMENTS

| CH | 277 397 A | 8/1951 |
| DE | 588 987 C | 11/1933 |

(Continued)

OTHER PUBLICATIONS

Machine translation of EP 1524057, printed Oct. 2015.*

*Primary Examiner* — Daniel Howell
(74) *Attorney, Agent, or Firm* — Pearne & Gordon LLP

(57) ABSTRACT

Described is an automatic threading machine comprising an electric motor (2) having a rotor (3) designed to selectively rotate in both directions about an axis (4) and a tool holder spindle (7) able to move with a rotating movement about the axis (4) and with a translating movement along the axis (4). The rotor (3) controls the rotating movement of the tool holder spindle (7) about the axis (4). The tool holder spindle (7) is supported by the rotor (3) and moves as one with it in the rotating movement about the axis (4). The rotor (3) has internally a chamber (5) along which the tool holder spindle (7) can translate along the axis (4) and which is suitable for at least partly housing the tool holder spindle (7) in at least one position adopted by the tool holder spindle.
The electric motor (2) comprises stator windings (10) arranged radially outside the rotor (3) and the chamber (5). The stator windings (10), the rotor (3) and the chamber (5) extend along the axis (4) for at least one shared stretch.

12 Claims, 2 Drawing Sheets

(56) References Cited

U.S. PATENT DOCUMENTS

| | | | | |
|---|---|---|---|---|
| 3,706,506 A | * | 12/1972 | Dorak | B23G 1/04 408/130 |
| 3,838,934 A | * | 10/1974 | Petroff | B23G 1/44 408/12 |
| 4,419,032 A | * | 12/1983 | Flowers | B23Q 5/045 408/112 |
| 4,934,040 A | | 6/1990 | Turchan | |
| 5,009,554 A | | 4/1991 | Kameyama et al. | |
| 5,100,271 A | | 3/1992 | Kameyama et al. | |

FOREIGN PATENT DOCUMENTS

| | | | | | |
|---|---|---|---|---|---|
| DE | 851 711 | C | | 10/1952 | |
| DE | 1876823 | U | * | 8/1963 | |
| DE | 1528088 | B1 | * | 9/1969 | B23Q 5/10 |
| DE | 39 30 306 | A1 | | 3/1991 | |
| DE | 4016480 | A1 | * | 11/1991 | B23B 39/162 |
| DE | 100 14 270 | C1 | | 6/2001 | |
| DE | 10 347 423 | A1 | | 5/2005 | |
| DE | 102006032189 | A1 | * | 1/2008 | B23Q 1/70 |
| EP | 1101555 | A2 | * | 5/2001 | B23B 39/161 |
| EP | 1 457 285 | A1 | | 9/2004 | |
| EP | 1524057 | A2 | * | 4/2005 | B23G 1/18 |
| EP | 1 775 049 | A1 | | 4/2007 | |
| GB | 812 872 | A | | 5/1959 | |
| IT | PN2003A000020 | A | | 9/2004 | |
| IT | PN2005A000071 | A | | 4/2007 | |

* cited by examiner

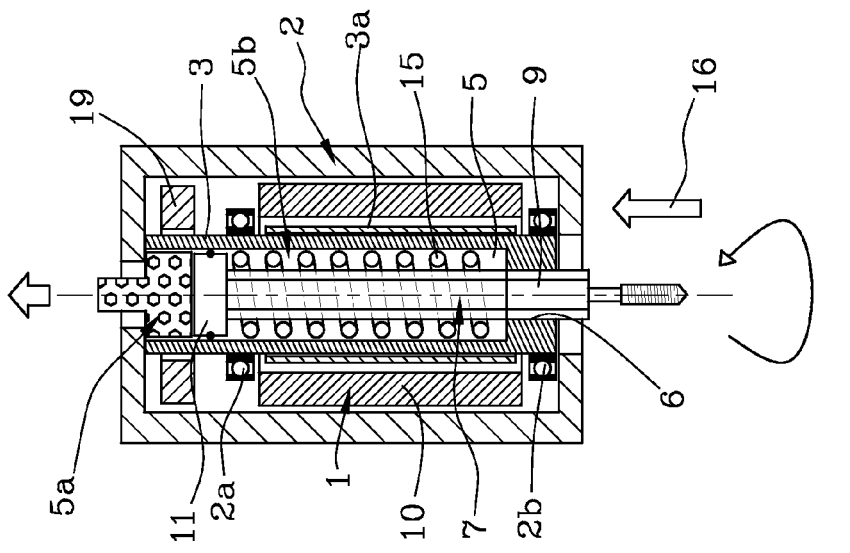
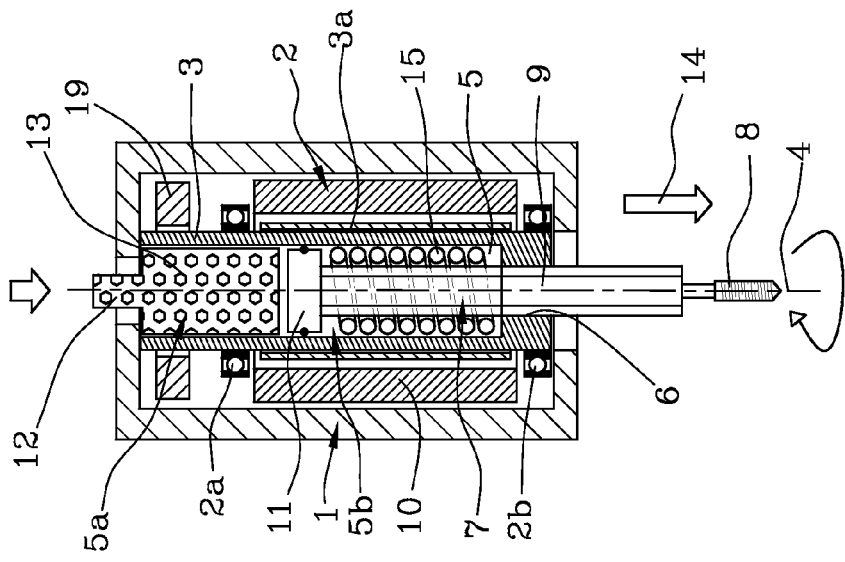
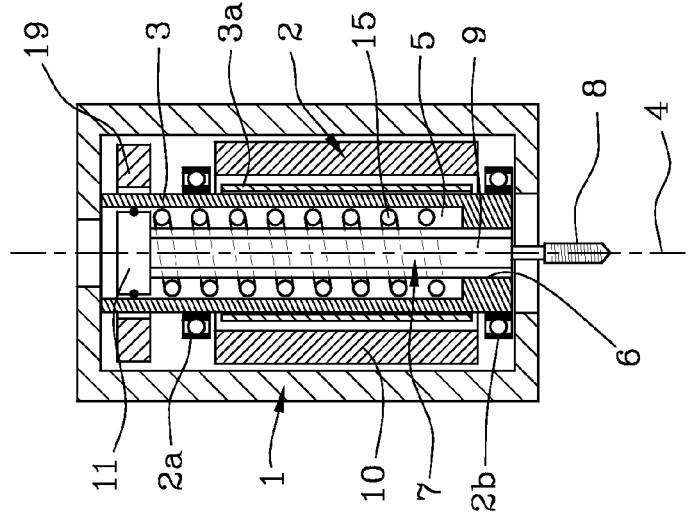

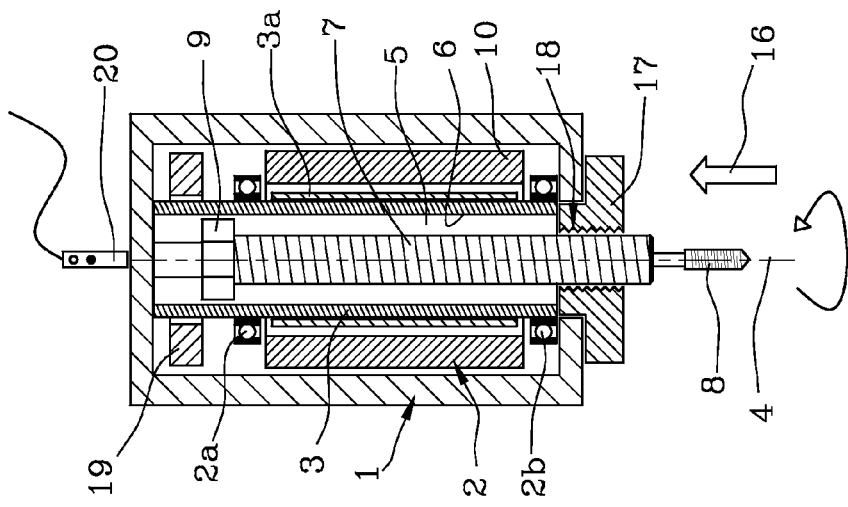
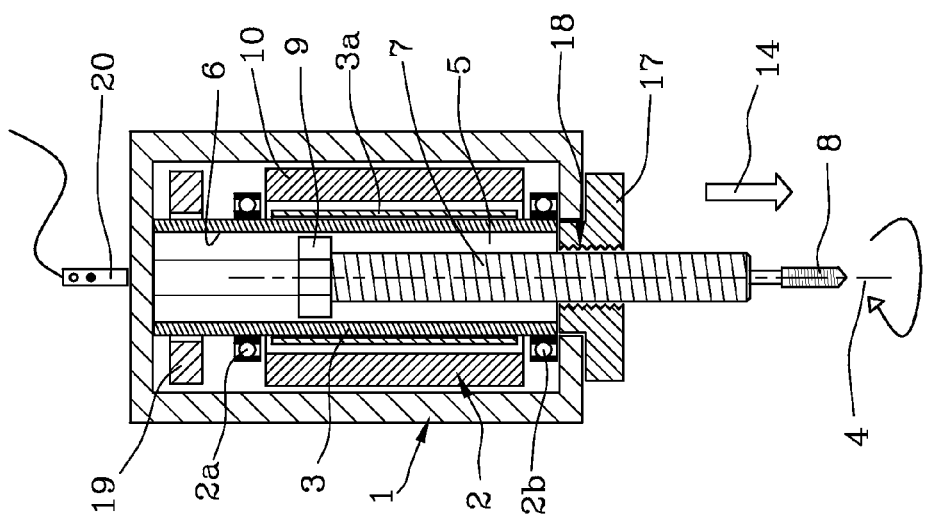
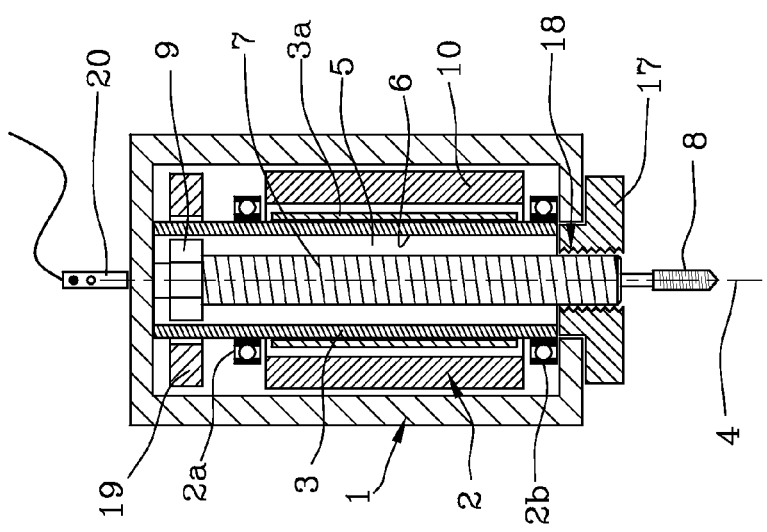

AUTOMATIC THREADING MACHINE

This invention relates to an automatic threading machine. In detail, this machine is designed for the threading of components.

More specifically, this invention relates to a machine designed both for the external threading of components and for the internal threading (tapping) of holes, both through and blind, made in a component. Preferably, the threading is performed on metallic components.

Below in this description reference will be made mainly to the internal threading (tapping) of holes made in a component.

The internal threading of metallic and non-metallic components is performed industrially in two steps. A first step comprises the creation of a hole (through or blind) in the component. A second step comprises the execution of the thread in the hole created previously.

The term "tapping" means this second step, that is, the operation of threading a hole using a tool known as a screw tap, generally fixed to a tool holder spindle. More specifically, two types of screw tap are known: the rolling screw tap and the cutting screw tap.

With regard to the execution of the external threading on the outer surface of a component, the thread is created using a tool such as, for example, a "die chaser" or a "thread-rolling head".

During the tapping step, the tool holder spindle, and consequently the tool, perform two movements: a rotational movement and a translational movement.

In order to generate at least the rotational movement of the tool, the prior art machines use a drive device which rotates the tool holder spindle and, therefore, the tool using drive means such as toothed belts or gears. In known solutions, the drive device comprises, for example, an electric motor, a hydraulic motor or a press.

The Applicant has noticed that the prior art machines are complex, cumbersome and noisy. More specifically, the Applicant has attributed these drawbacks to the presence of the drive means generally located between the motor and the tool holder spindle which significantly affects the number of components making up the machine and, consequently, the final cost, too.

The Applicant has therefore found that preparing an automatic threading machine wherein the tool holder spindle is supported directly by the rotor of an electric motor and is integral with it in the rotational movement and wherein the rotor and the tool holder spindle rotate as one about an axis avoids the presence of drive means.

This arrangement of the components allows an improved machine to be obtained, in particular in terms of dimensions. This effect is achieved both by the relative layout of the components and because this layout makes the use of drive means superfluous.

In addition to the above, it should be noted that by being able to avoid drive means, an effect of the machine according to this invention is that of a reduced noise and a reduced structural complexity, thus reducing production costs.

Another effects of the machine according to this invention is that of being able to transmit a greater power to the tool since the transmission of the motion from the motor to the tool takes place without the use of gear wheels, belts or drive screws, but by directly connecting the tool holder spindle to the rotor of the electric motor.

Yet another effect is that the rotor and the tool holder spindle rotate with the same rotation speed.

According to a first aspect, this invention relates to an automatic machine for threading holes comprising an electric motor having a rotor designed to selectively rotate in both directions, a tool holder spindle able to move with a rotating movement about an axis and with a translating movement along the axis. The rotor controls the rotating movement of the tool holder spindle about an axis. The tool holder spindle is supported by the rotor and moves as one with it in the rotating movement about the axis. The rotor of the electric motor rotates about the axis.

As mentioned above, these features allow the dimensions of the machine to be reduced, due both to the arrangement of the components and the absence of drive means.

With regard to the above-mentioned aspect, the machine according to this invention can comprise one or more of the above-mentioned features.

Preferably, the tool holder spindle is connected to the rotor by a shape coupling able to prevent relative rotation about the above-mentioned axis and allow the relative translation along the axis. This feature has the effect of further simplifying the arrangement of the components guaranteeing in an efficient manner the rotation of the tool holder spindle.

Preferably, the rotor has a cavity for coupling with at least one portion of the tool holder spindle. The coupling cavity and the relative portion of the tool holder spindle have respective joined profiles which are suitable for drawing in rotation the tool holder spindle about the axis and for allowing the tool holder spindle to translate relative to the rotor along the axis. This feature has the effect of guaranteeing in an efficient manner the rotation of the tool holder spindle.

Preferably, the coupling cavity of the rotor and the portion of the tool holder spindle have a hexagonal profile in a plane perpendicular to the axis. This configuration represents an optimum solution in particular in terms of the coupling profile between rotor and tool holder spindle.

Preferably, the rotor has internally a chamber along which the tool holder spindle can translate along the axis. The chamber is suitable for at least partly housing the tool holder spindle in at least one position adopted by the tool holder spindle. This feature has the effect of further simplifying the arrangement of the components guaranteeing compactness in particular in an axial direction.

Preferably, the rotor is hollow and inside forms the chamber which extends along the axis along which the tool holder spindle can translate. This feature has the effect of limiting the dimensions and simplifying the construction of the machine.

Preferably, the electric motor comprises stator windings arranged radially outside the rotor and the chamber. The stator windings, the rotor and the chamber extend along the axis for at least one shared stretch. This feature has the effect of generating a motor integrated in the machine, which is optimum both in terms of the dimensions and the operation.

Preferably, the coupling cavity of the rotor is formed by at least one stretch of the chamber extending along the axis. This feature has the effect of simplifying the construction of the rotor as it can be constructed using a hollow element.

Preferably, the cavity has dimensions transversal to the axis less than the rest of the chamber. This feature has the effect of distinguishing the function of rotating the tool holder spindle from other functions, for example the seal if pressurised fluids are used.

Preferably, there is a piston designed to slide in a sealed fashion in the chamber equipped with means for connecting to a source of pressurised fluid designed to operate on the piston and, by means of the piston, on the tool holder spindle, for generating its translating motion along the axis in at least a direction approaching a component to be threaded. This feature has the effect of making the machine structure even more compact, comprising a command, for example pneumatic or hydraulic, integrated in the rotor.

Preferably, there are return means, preferably elastic, operating on the tool holder spindle for generating the translating motion along the axis in a direction moving away from the component to be threaded. This feature has the effect of distinguishing the feeding step of the tool from the return step, thus also allowing two different speeds.

Alternatively, the piston and the rotor can form a double-acting cylinder. This feature has the effect of avoiding mechanical return components.

Preferably, the return means comprise a spring positioned inside the chamber around the tool holder spindle. This feature has the effect of simplifying and making the machine structure even more compact.

Preferably, there is a male and female screw coupling between the tool holder spindle and a housing casing. The male and female screw coupling is such as to generate the translating movement of the tool holder spindle drawn in rotation by the rotor. This feature has the effect of making the machine independent of external feeding systems, for example pressurised fluids.

Preferably, the electric motor is controlled by an electronic control unit which controls one or more of the following parameters: position of the tool holder spindle, direction of rotation of the rotor, speed of rotation of the rotor, injection of any pressurised fluid for generating the translating motion of the tool holder spindle, motor torque.

Preferably, the electric motor is of the brushless type.

Other features and advantages of the invention are more apparent in the detailed description below, with reference to a non-limiting and non-exclusive preferred embodiment of an automatic threading machine, as illustrated in the accompanying drawings, in which:

FIGS. 1 to 3 are schematic cross sections of a portion of an automatic threading machine according to this invention, in three different configurations;

FIGS. 4 to 6 are schematic cross sections of a second embodiment of a portion of an automatic threading machine, in three different configurations.

With reference to FIGS. 1 to 3, the numeral 1 denotes a casing of an automatic threading machine. The casing 1 houses at least one unit of the automatic machine.

Numeral 2 denotes an electric motor. The electric motor 2 is housed in the casing 1. The electric motor 2 is, for example, of the brushless type.

The electric motor 2 comprises a rotor 3 designed to selectively rotate in both directions relative to the casing 1. For example, the rotor 3 is housed in the casing 1 with interposition of bearings 2a, 2b in such a way as to allow the rotation.

Numeral 3a denotes magnets of the rotor 3.

Numeral 4 denotes an axis which in the example illustrated represents both an axis of rotation and an axis of symmetry of the rotor 3.

The rotor 3 is hollow and inside forms a chamber 5 which extends along the axis 4. In the example illustrated in FIGS. 1 to 3 the chamber 5 has a circular cross-section in a plane perpendicular to the axis 4. The chamber 5 is partly closed at one end forming a cavity 6 having dimensions transversal to the axis 4 less than the rest of the chamber.

Numeral 7 denotes a tool holder spindle on which a tool 8 (screw tap) is mounted threaded externally to perform the "tapping".

In an alternative embodiment not shown in the accompanying figures, the tool 8 has an opening threaded internally for performing the external threading of a component. More specifically, the opening extends along the axis 4 and it is formed by a lateral surface inside the tool. This internal lateral surface is threaded. In this way, the component to be threaded is at least partly inserted in the opening and the internal lateral surface works on the outside of the component so as to thread it.

The tool holder spindle 7 is movable with a rotating movement about the axis 4, relative to the casing 1.

Moreover, the tool holder spindle 7 is movable with a translating movement along the above-mentioned axis 4, relative to the casing 1.

More specifically, the tool holder spindle 7 can translate along the axis 4 relative to the rotor 3, preferably inside and relative to the chamber 5 of the rotor 3.

FIGS. 1 to 3 illustrate three different positions of the tool holder spindle 7.

In at least one of the positions adopted by the tool holder spindle 7, the chamber 5 is suitable for housing the tool holder spindle at least partly.

More specifically, FIG. 1 illustrates a configuration in which the tool holder spindle 7 is completely housed inside the chamber 5 of the rotor 3.

The rotor 3 controls the rotating movement of the tool holder spindle 7 about the axis 4. More specifically, the tool holder spindle 7 is supported by the rotor 3 and moves as one with it in the rotating movement about the axis 4.

The tool holder spindle 7 is connected to the rotor 3 by a shape coupling able to prevent relative rotation about the axis 4 and allow the relative translation along the axis.

More specifically, the cavity 6 of the rotor 3 is a cavity for coupling with at least one portion 9 of the tool holder spindle 7. More specifically, the cavity 6 and the portion 9 of the tool holder spindle 7 have respective joined profiles which are suitable for drawing in rotation the tool holder spindle 7 about the axis 4 and for allowing the translation along the axis relative to the rotor 3. The cavity 6 of the rotor 3 and the portion 9 of the tool holder spindle 7 have, for example, a hexagonal profile in a plane perpendicular to the axis 4. Different profiles can be used to make the above-mentioned shape coupling.

Numeral 10 denotes stator windings of the electric motor 2. The stator windings 10 arranged radially outside the rotor 3 and the chamber 5. The stator windings 10, the rotor 3 and the chamber 5 extend along the axis 4 for at least one shared stretch. More specifically, the stator windings 10, the rotor 3 and the chamber 5 are located inside the casing 1.

A piston 11 is designed to slide in a sealed fashion inside the chamber 5 and to act on the tool holder spindle 7. Preferably, the tool holder spindle 7 comprises the piston 11. In addition, the piston 11 has a relative external profile (facing the hollow rotor 3) shaped to match the internal profile of the hollow rotor 3 in such a way as to allow translation of the tool holder spindle 7 relative to the hollow rotor 3.

The chamber 5 comprises means 12 for connection to a source of pressurised fluid 13 (not illustrated) designed to operate on the piston 11 and, consequently, on the tool holder spindle 7, for generating its translating motion along the axis 4 in at least one direction, preferably a direction 14 approaching a component to be threaded (not illustrated). In the example illustrated, the source of pressurised fluid is a source of compressed air.

More specifically, the piston 11 divides the chamber 5 into an upper chamber 5a (with reference to the arrangement of FIG. 2) and a lower chamber 5b. The upper chamber 5a is equipped with connecting means 12. The lower chamber 5b comprises return means 15, preferably elastic, operating on the tool holder spindle 7 for generating the translating motion along the axis 4 in a direction moving away from the component to be threaded (direction 16).

The return means comprise a spring positioned inside the chamber 5. The spring is wound about the tool holder spindle 7.

As an alternative to the spring, the piston inside the rotor 3 can form a double-acting cylinder. In that case, the connecting means 12 comprise an additional conduit (not illustrated in the accompanying drawings) connecting between the source of pressurised fluid 13 and the lower chamber 5b for feeding to the latter the pressurised fluid 13.

In this way, the pressurised fluid 13 acts on the piston 11 in the moving away direction 16 to return the tool 8 to its initial position.

With reference to FIGS. 4 to 6, the elements which are in common with the machine illustrated in FIGS. 1-3 have been indicated with the same reference numeral. Described in detail below are the references relative to the embodiment illustrated in FIGS. 1 to 3.

The machine comprises a male and female screw coupling 17 between the tool holder spindle 7 and the housing casing 1. The male and female screw coupling is such as to generate the translating movement of the tool holder spindle 7 drawn in rotation by the rotor 3. Consequently, the male and female screw coupling replaces the source of pressurised fluid and the piston housed in a sealed manner in the chamber 5 illustrated in FIGS. 1 to 3.

More specifically, the tool holder spindle 7 is threaded on its external surface (male screw) and slides inside a threaded bushing 18 (female screw 17). The threaded bushing 18 is integral with the casing 1.

The inside of the chamber 5, or at least a stretch of the chamber 5 which extends along the axis 4, forms the shape coupling cavity 6 between the rotor 3 and a portion 9 of the tool holder spindle 7. More specifically, the rotor 3 is hollow and inside forms a chamber 5 which extends along the axis 4 open on both sides. The portion 9 of the tool holder spindle 7 which couples with the cavity 6 is, for example, formed by a head of the spindle.

The cavity 6 and the relative portion 9 of the tool holder spindle 7 (head) have respective joined profiles which are suitable for drawing in rotation the tool holder spindle 7 about the axis 4 and for allowing the translation along the axis of the tool holder spindle relative to the rotor 3.

In the example illustrated in FIGS. 4 to 6 the chamber 5 has a hexagonal cross-section in a plane perpendicular to the axis 4 and the tool holder spindle 7 comprises the hexagonal-shaped head. Different profiles can be made to form the shape coupling between the rotor 3 and the tool holder spindle 7.

The coupling between the head of the tool holder spindle 7 and the rotor 3 forms a shape coupling able to prevent relative rotation about the axis 4 of the rotor 3 and of the tool holder spindle 7 and allow the relative translation of the tool holder spindle 7 relative to the rotor 3 along the axis 4.

In use, the machine illustrated in FIGS. 1 to 3 operates as follows:
    the rotational movement is transmitted to the tool directly by the rotor 3 of the electric motor 2 (brushless) which reverses the direction of rotation following an electronic command;
    the translational movement is transmitted to the tool 8 by the rotor 3 of the electric motor 2 which houses inside it a piston (for example, of the compressed-air type) which is also operated by the same electronic command.

The movement of the tool 8 is accomplished by direct transmission.

FIGS. 1 to 3 correspond to three steps which alternate cyclically. In FIG. 1 the tool holder spindle 7 and, therefore, the tool 8 rotate. In FIG. 2 the source of pressurised fluid (air) is activated, entering the upper chamber 5a and translating the tool 8 towards the component to be threaded until the tool 8 touches the component with the hole to be threaded (not shown in the drawing). The tool 8 is thus introduced, and the source of pressurised fluid is deactivated. The tool 8 makes the thread, rotated by the tool holder spindle 7. In FIG. 3, after making the thread, the motor and, therefore, the tool 8 rotate in opposite directions (after a specific electronic command). The tool 8 exits the thread and is returned to the initial position by the return spring and its direction of rotation is reversed, ready for a new processing cycle.

The electric motor 2 is controlled by an electronic control unit which controls one or more of the following parameters: position of the tool holder spindle 7 (from data obtained by resolvers or encoders or Hall sensors etc., generally indicated in the drawings with the numeral 19), direction of rotation of the rotor 3, speed of rotation of the rotor 3, injection of any pressurised fluid for generating the translating motion of the tool holder spindle 7, motor torque.

More specifically, the electric motor 2 is controlled by an electronic card.

More specifically, the control of the motor torque allows it to be understood when the tool 8 starts the threading operation as the motor torque increases at the moment.

From that moment the electronic control counts the number of revolutions of the tool 8 with the data coming from resolvers or encoders or Hall sensors etc and, after performing the predetermined revolutions, at the end of the threading, the electronic control reverses the direction of rotation of the tool 8, extracting it at the maximum speed of revolution.

The speed of rotation of the rotor 3 and, therefore, of the tool 8, is not fixed. During the threading, the speed of rotation is such as to not allow the threading parameters to be exceeded which, if exceeded, would adversely affect the service life of the tool 8. During the extraction the speed of rotation of the tool 8 is at its greatest to reduce the processing cycle time.

The control of the threading speed (and more specifically of the tapping) has been described in patent application PN2003A000020 in the name of the same Applicant which is incorporated herein by reference as it is also applicable to this invention.

The control of the motor torque by measuring the energy absorption of the motor allows the sensors for measuring the position of the tool 8 to be eliminated. This aspect has been described in patent application PN20050071 in the name of the same Applicant which is incorporated herein by reference as it is also applicable to this invention.

In use, the machine illustrated in FIGS. 4 to 6 operates as follows:
    the rotational movement is transmitted to the tool 8 directly by the rotor 3 of the electric motor 2 (brushless) which reverses the direction of rotation following an electronic command;
    the translational movement is transmitted to the tool 8 by a male and female screw coupling.

More specifically, it should be noted that once the thread has been made, the electric motor 2 and, therefore, the tool 8 rotate in opposite directions (after a specific electronic command). This rotation (in opposite directions) returns the tool 8 to the initial position by the male and female screw coupling 17. After reaching the initial position, the tool holder spindle 7 stops. Once the tool holder spindle 7 has stopped, the electronic command reverses again the direction of rotation of the electric motor 2 and the tool 8 is ready for a new work cycle.

The external threading of the tool holder spindle 7 can have a pitch equal to that of the tool 8. In this case, when the tool holder spindle 7 performs a certain number of revolutions, the tool 8 performs the same number of revolutions and the same translation.

Alternatively, the external threading of the tool holder spindle 7 can have a pitch different to that of the tool 8. In this case, in order to perform the same translation a compensating spring (not illustrated) is interposed between the tool holder spindle 7 and the tool 8.

FIGS. 4 to 6 illustrate a position sensor 20 which informs the control card of the presence (or absence) of the tool holder spindle 7.

The invention claimed is:

1. An automatic threading machine comprising:
    an electric motor (2) comprising a rotor (3) designed to selectively rotate in both directions,
    a tool holder spindle (7) able to move with a rotating movement about an axis (4) and with a translating movement along the axis (4),
    wherein the rotor (3) controls the rotating movement of the tool holder spindle (7) about the axis (4),
    the tool holder spindle (7) being supported by the rotor (3) and moving as one with it in the rotating movement about the axis (4), the rotor (3) of the electric motor (2) rotating about the axis (4);
    the rotor (3) having internally a chamber (5) along which the tool holder spindle (7) can translate along the axis (4) and which is suitable for at least partly housing the tool holder spindle (7) in at least one position adopted by the tool holder spindle (7);
    a piston (11) designed to slide in a sealed fashion in the chamber (5) comprising means (12) for connection to a source of pressurised fluid (13) which are designed to operate on the piston (11) and, by means of the piston, on the tool holder spindle (7), for generating its translating motion along the axis (4) in a direction (14) approaching a component to be threaded;
    characterized in that it comprises a spring (15) positioned inside the chamber (5) around the tool holder spindle (7) operating on the tool holder spindle (7) for generating the translating motion along the axis (4) in a direction (16) moving away from the component to be threaded; said spring (15) being positioned, at least in part, in the magnetic or electromagnetic field generated by the electric motor (2) for moving the rotor (3).

2. The automatic threading machine according to claim 1, wherein the tool holder spindle (7) is connected to the rotor (3) by a shape coupling able to prevent relative rotation about the axis (4) and to allow its relative translation along the axis (4).

3. The automatic threading machine according to claim 2, wherein the rotor (3) comprises a cavity (6) for coupling with at least one portion (9) of the tool holder spindle (7) and wherein said cavity (6) and said portion (9) of the tool holder spindle (7) have respective joined profiles which are suitable for drawing in rotation the tool holder spindle (7) about the axis (4) and for allowing the tool holder spindle (7) to translate along the axis (4) relative to the rotor (3).

4. The automatic threading machine according to claim 3, wherein the cavity (6) of the rotor (3) and the portion (9) of the tool holder spindle (7) have a hexagonal profile in a plane perpendicular to the axis (4).

5. The automatic threading machine according to claim 3, wherein the cavity (6) is formed by at least one stretch of the chamber (5) extending along the axis (4).

6. The automatic threading machine according to claim 5, wherein the cavity (6) has dimensions transversal to the axis (4) which are smaller than the rest of the chamber (5).

7. The automatic threading machine according to claim 1, wherein the rotor (3) is hollow and inside forms the chamber (5) which extends along the axis (4) along which the tool holder spindle (7) can translate.

8. The automatic threading machine according to claim 1, wherein the electric motor (2) comprises stator windings (10) arranged radially outside the rotor (3) and the chamber (5), and wherein the stator windings (10), the rotor (3) and the chamber (5) extend along the axis (4) for at least one shared stretch.

9. The automatic threading machine according to claim 7, wherein the electric motor (2) comprises stator windings (10) arranged radially outside the rotor (3) and the chamber (5), and wherein the stator windings (10), the rotor (3) and the chamber (5) extend along the axis (4) for at least one shared stretch.

10. The automatic threading machine according to claim 1, wherein the electric motor (2) is controlled by an electronic control unit which controls one or more of the following parameters: position of the tool holder spindle (7), direction of rotation of the rotor (3), speed of rotation of the rotor (3), injection of any pressurised fluid (13) for generating the translating motion of the tool holder spindle (7), motor (2) torque.

11. The automatic threading machine according to claim 1, characterised in that it comprises an externally threaded tool (8) mounted on the tool holder spindle (7) for cutting a thread in a hole.

12. The automatic threading machine according to claim 1, characterised in that it comprises a tool (8) mounted on the tool holder spindle (7) and comprising an internally threaded opening for cutting a thread on the outside of a component.

* * * * *